United States Patent [19]
Townsend

[11] Patent Number: 5,279,516
[45] Date of Patent: Jan. 18, 1994

[54] APPARATUS AND METHOD FOR LINKING AN ELONGATED EXTRUDED MEAT PRODUCT

[75] Inventor: Ray T. Townsend, Des Moines, Iowa

[73] Assignee: Townsend Engineering Company, Des Moines, Iowa

[21] Appl. No.: 928,951

[22] Filed: Aug. 11, 1992

[51] Int. Cl.$^5$ ............................................. A22C 15/00
[52] U.S. Cl. ......................................... 452/48; 452/46
[58] Field of Search ............................. 452/46, 48, 47

[56] References Cited

U.S. PATENT DOCUMENTS

| | | | |
|---|---|---|---|
| 661,073 | 11/1900 | Paulitschke et al. | 452/48 |
| 870,972 | 11/1907 | Little | 452/47 |
| 2,133,463 | 10/1938 | Molin | 452/48 |
| 2,356,099 | 8/1944 | Swoboda, Sr. | 452/47 |
| 2,477,031 | 7/1949 | Armbrust | 452/47 |
| 4,494,276 | 1/1985 | Trottmann | 452/51 |

Primary Examiner—Willis Little
Attorney, Agent, or Firm—Zarley, McKee, Thomte, Voorhees, & Sease

[57] ABSTRACT

Three parallel auger shafts having identical flighting thereon disposed on axes equally spaced from each other to provide a central axis equidistant from the axes of the augers. An elongated strand of extruded meat product is moved through the central axis thereof so that when the flighting on the augers meet at a common point, the diameter of the strand is compressed to create a link in the strand. In a second embodiment of the invention places the three augers in a rotatable assembly with the augers rotating about their own axes as well as the central axis. A third embodiment utilizes a casing control element on the inlet end of each auger to cooperate with the nozzle or horn through which the extruded material is being delivered whereupon the control elements rotate the casing material and control the expansion of the casing material to its full diameter as the meat emulsion flows into the casing.

24 Claims, 7 Drawing Sheets

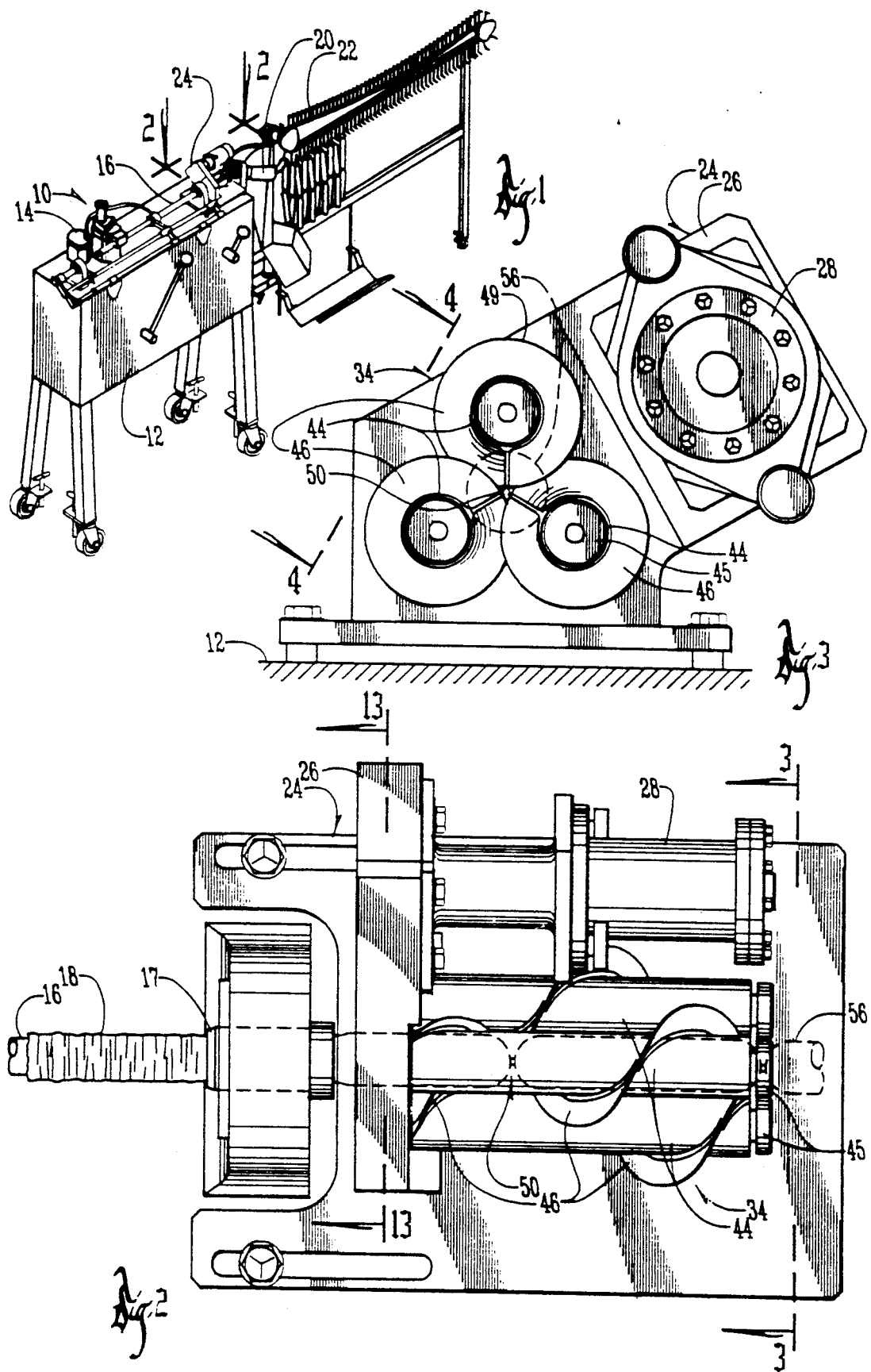

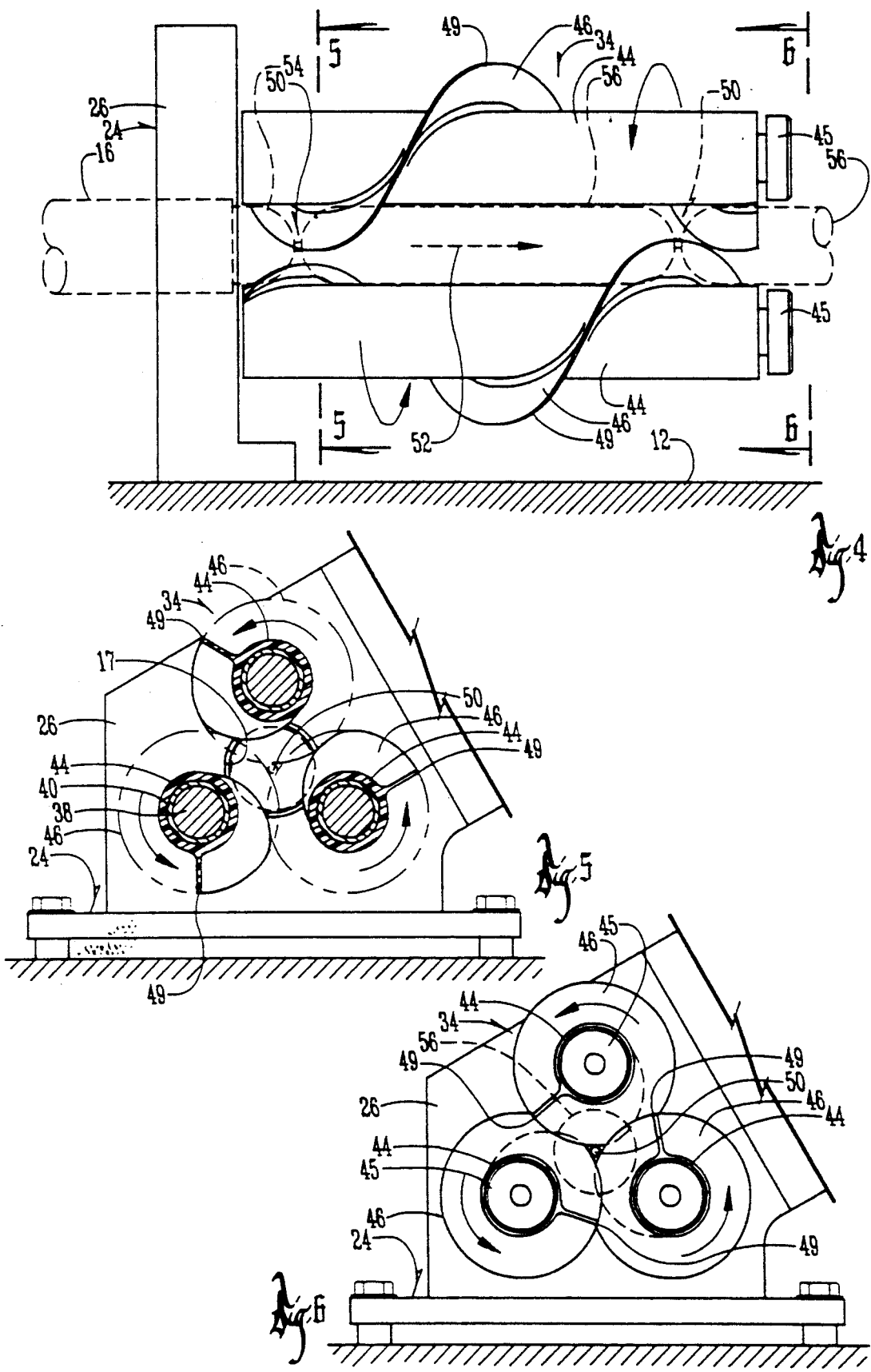

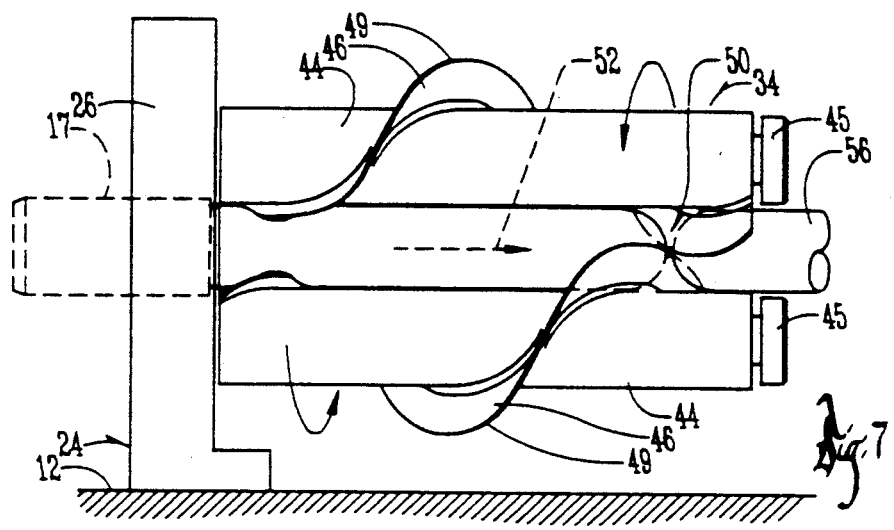
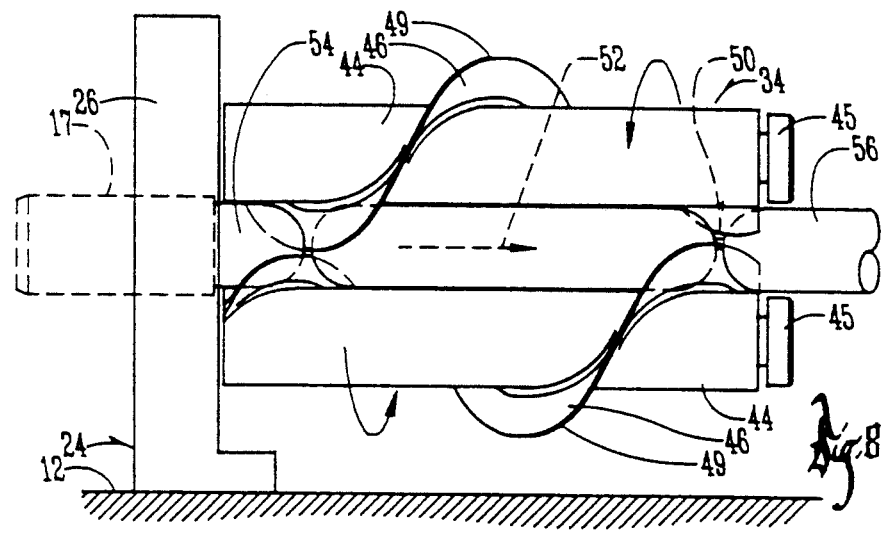
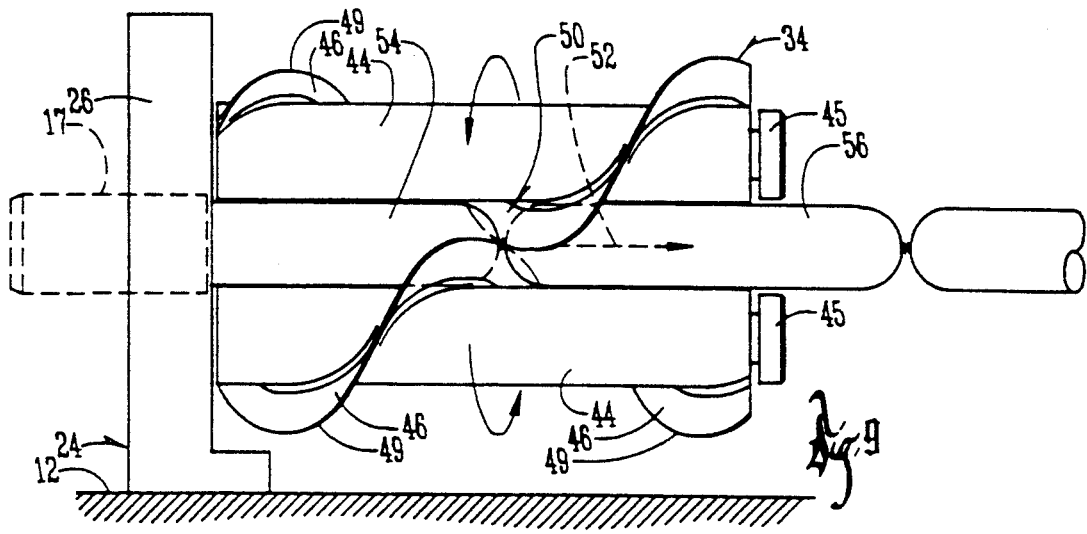

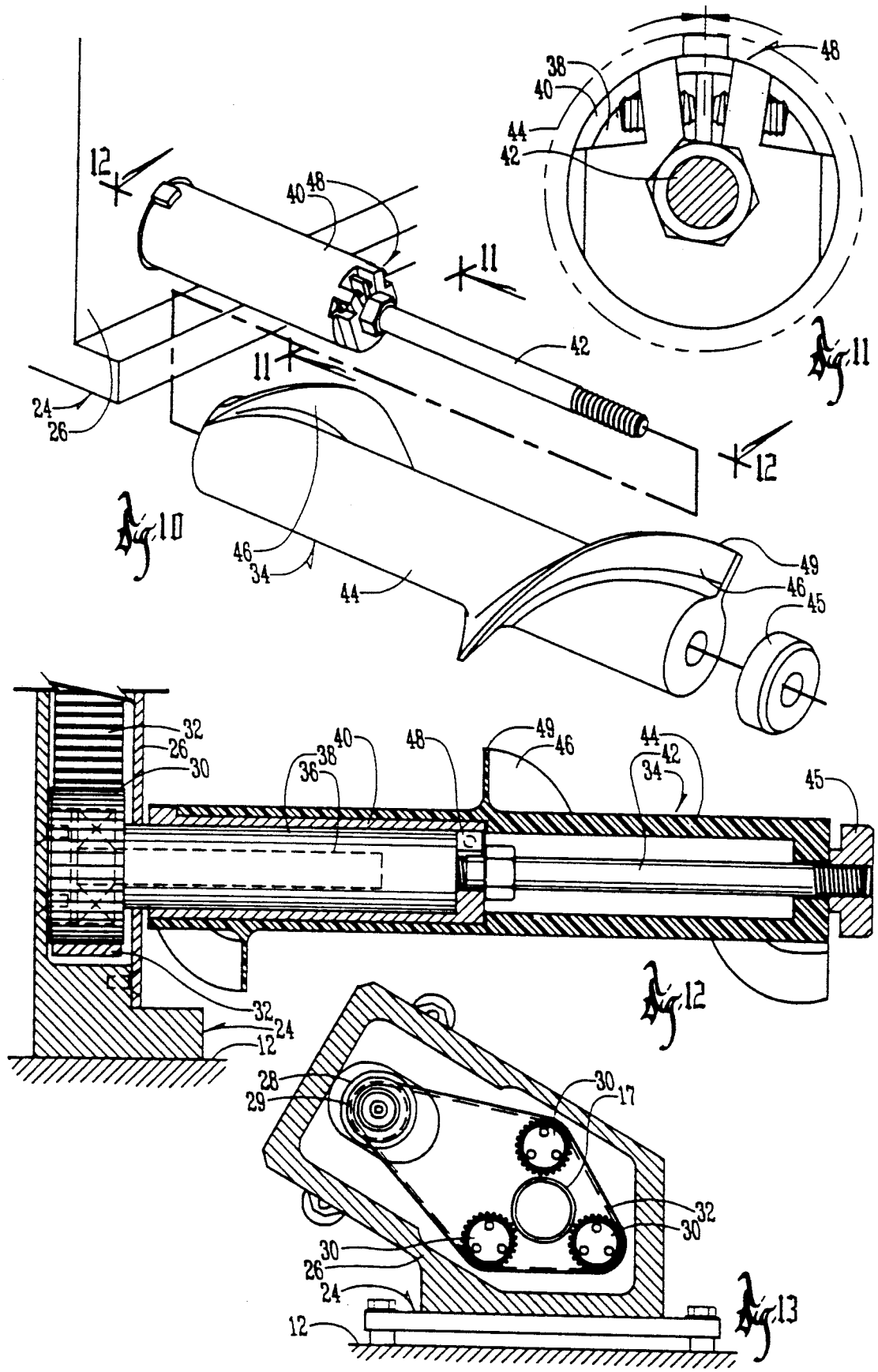

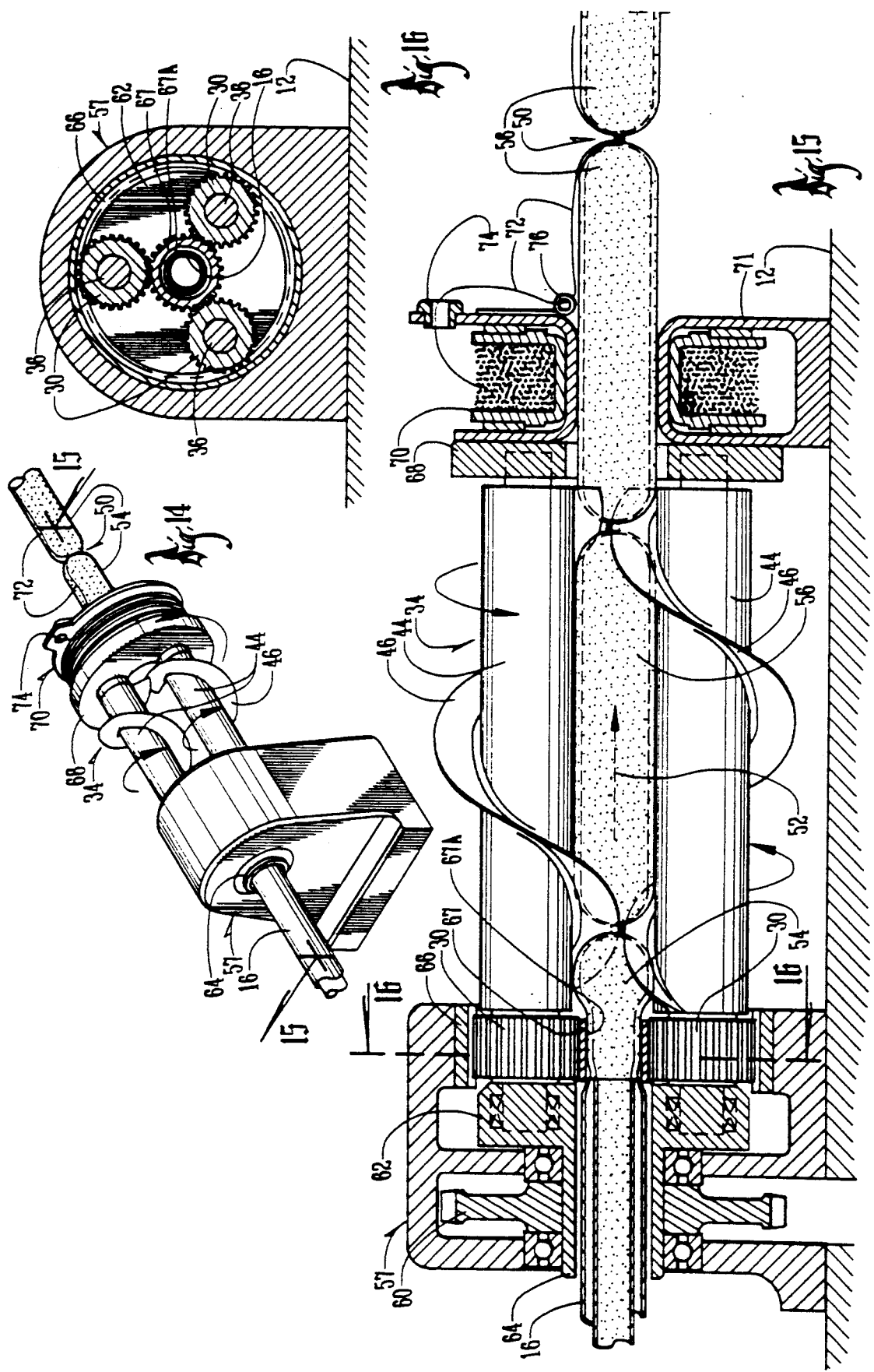

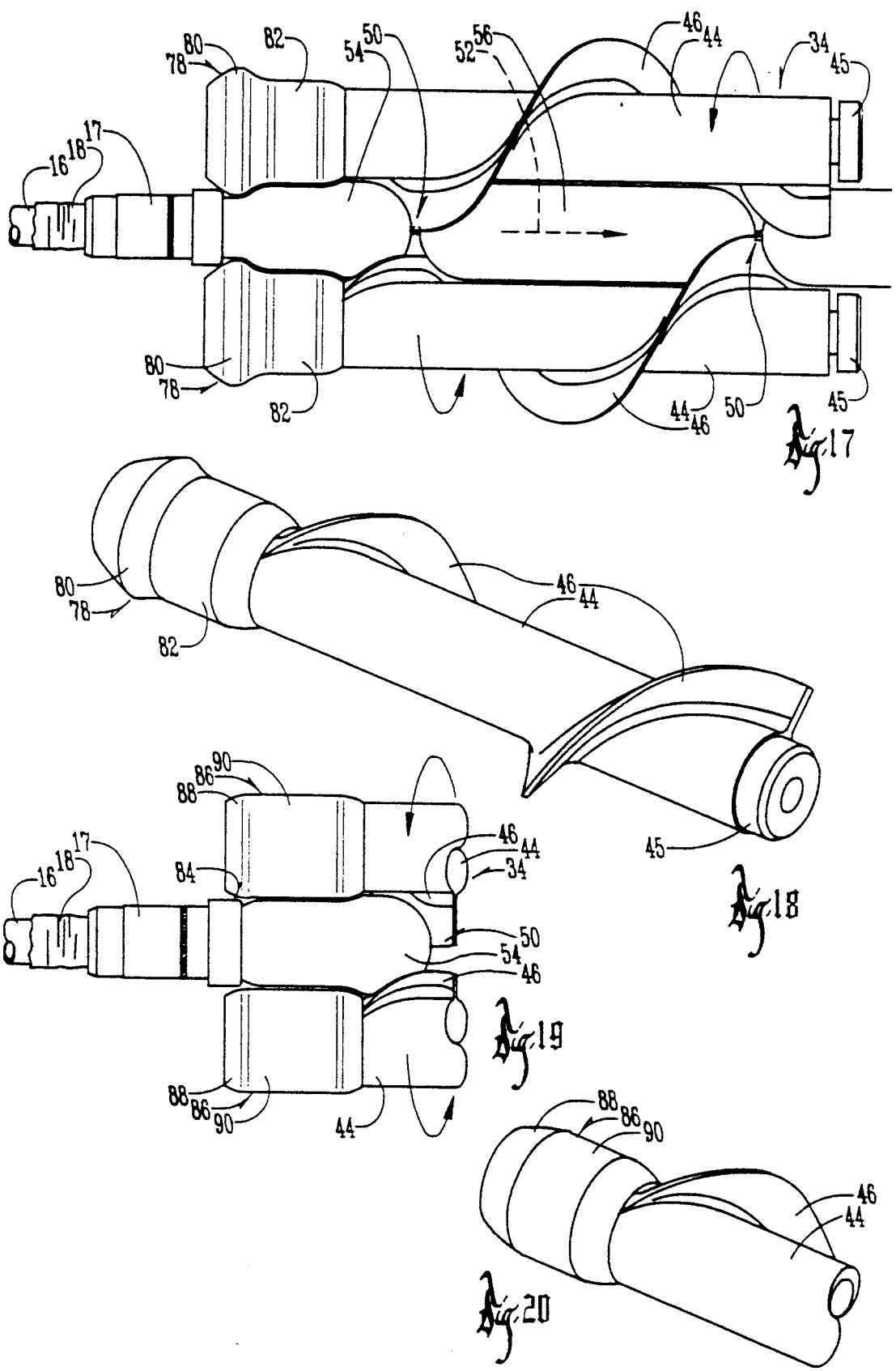

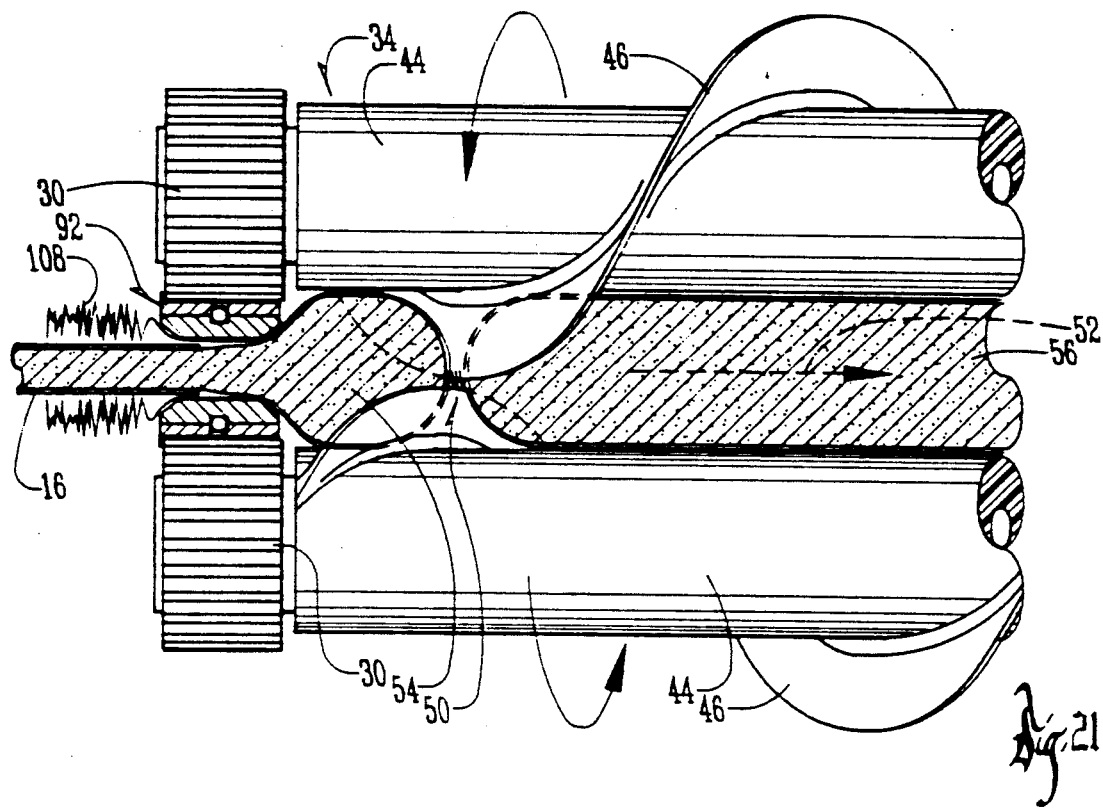
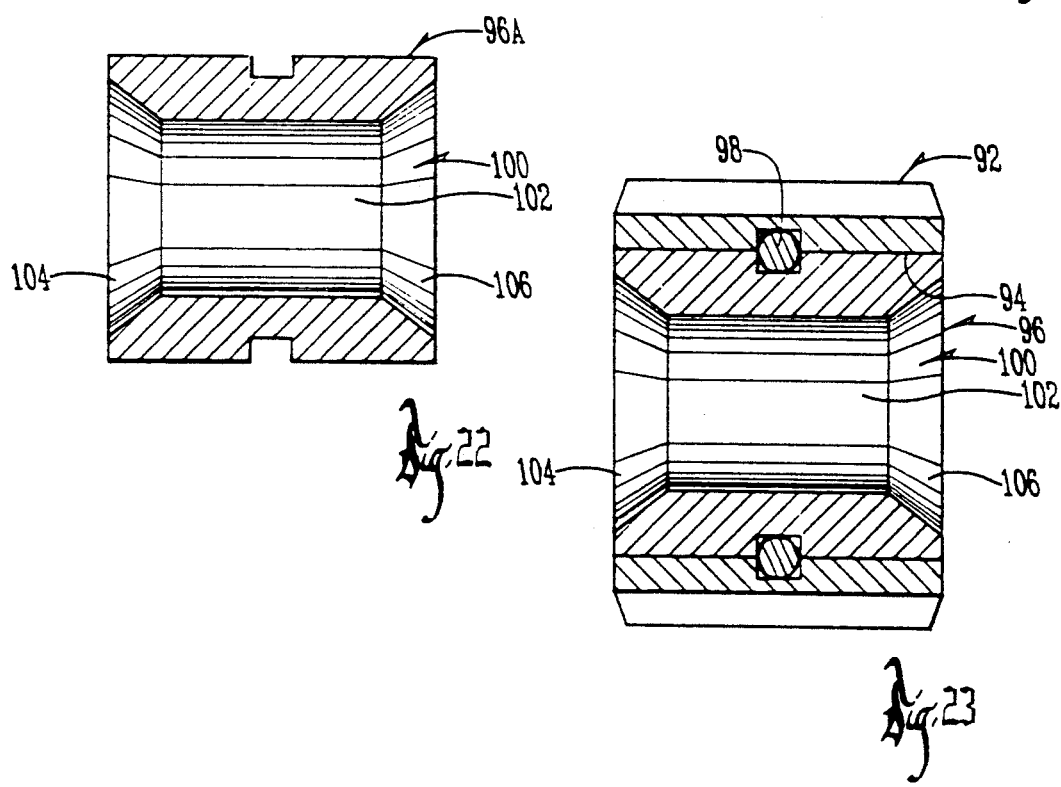

5,279,516

APPARATUS AND METHOD FOR LINKING AN ELONGATED EXTRUDED MEAT PRODUCT

BACKGROUND OF THE INVENTION

Encased meat products have long been linked by means of a pair of linking chains as typically shown in U.S. Pat. No. 3,115,668. These linking chains are expensive to fabricate, and are somewhat difficult to clean. Further, they are an aggressive mechanism and are not suitable for linking a strand of extruded meat product that is fragile and which cannot be rotated prior to being moved through the linking chains.

It is therefore a principal object of this invention to provide an apparatus and method for linking a fragile extruded meat strand which is effective to create the linking function regardless of whether or the meat strand is encased, and regardless of whether or not the meat strand is rotating.

A further object of this invention is to provide an apparatus and method for linking a fragile extruded meat product utilizing three elongated identical augers with the meat strand being moved through a central axis among the augers wherein the flighting on the augers intermittently compress the strand to create a link portion.

These and other objects will be apparent to those skilled in the art.

BRIEF SUMMARY OF THE INVENTION

The preferred embodiment of this invention provides three parallel auger shafts having identical flighting thereon disposed on axes equally spaced from each other to provide a central axis equidistant from the axes of the augers. An elongated strand of extruded meat product is moved through the central axis thereof so that when the flighting on the augers meet at a common point, the diameter of the strand is compressed to create a link in the strand.

A second embodiment of the invention places the three augers in a rotatable assembly with the augers rotating about their own axes as well as the central axis. This embodiment is useful particularly with strands which are particularly fragile and which do not have a separate casing material on the outside thereof.

A third embodiment of the invention utilizes a casing control element on the inlet end of each auger to cooperate with the nozzle or horn through which the extruded material is being delivered whereupon the control elements rotate the casing material and control the expansion of the casing material to its full diameter as the meat emulsion flows into the casing.

BRIEF DESCRIPTION OF THE DRAWINGS

FIG. 1 is a perspective view of a sausage encasing machine utilizing this invention;

FIG. 2 is a plan view of the auger assembly of this invention taken on line 2—2 of FIG. 1;

FIG. 3 is a front elevational view of the auger assembly of this invention taken on line 3—3 of FIG. 2;

FIG. 4 is a side elevational view of the auger assembly taken on line 4—4 of FIG. 3;

FIG. 5 is a sectional view of the auger assembly taken on line 5—5 of FIG. 4;

FIG. 6 is an end elevational view of the auger assembly taken on line 6—6 of FIG. 4;

FIGS. 7, 8 and 9 are elevational views similar to that of FIG. 4 but showing the augers in various positions of rotation;

FIG. 10 is an exploded view of the auger structure;

FIG. 11 is a large scale sectional view taken on line 11—11 of FIG. 10;

FIG. 12 is a sectional view taken on line 12—12 of FIG. 10;

FIG. 13 is a sectional view through the gear casing of the auger assembly taken on line 13—13 of FIG. 2;

FIG. 14 is a perspective view of an alternate form of the invention;

FIG. 15 is a large scale sectional view taken on line 15—15 of FIG. 14;

FIG. 16 is a small scale sectional view taken on line 16—16 of FIG. 15;

FIG. 17 is a plan view of a further alternate form of the invention;

FIG. 18 is a perspective view of the auger structure of FIG. 17;

FIG. 19 is a partial plan view similar to that of FIG. 17 but shows an alternate casing control element;

FIG. 20 is a partial perspective view of the control element shown in FIG. 19;

FIG. 21 is a further alternate form of the invention;

FIG. 22 is an elongated scale sectional view of the sun gear and chuck of FIG. 21; and FIG. 23 is a sectional view of an alternate chuck insert.

DESCRIPTION OF THE PREFERRED EMBODIMENT

The sausage encasing machine 10 of FIG. 1 has a frame 12, meat emulsion pump 14, horn 16; chuck 17; and a typical shirred casing 18. A looper horn 20 is adapted to convey the linked product to a conventional conveyor 22. The foregoing structure is conventional in the art and does not of itself comprise the essence of this invention.

With reference to FIGS. 2 and 3, an auger frame 24 has a gear casing 26 to which is attached a motor 28 which can be either electrically operated or hydraulically operated. A drive gear 29 (FIG. 13) is operatively connected to motor 28. Three sprocket gears 30 are disposed within gear casing 26 and are interconnected with drive gear 29 by belt 32.

Three augers 34 are connected to gears 30 by means of stub shaft 36 (FIG. 12). A subshaft 38 fits over stubshaft 36 in rigid contact therewith, and a sleeve 40 extends over subshaft 38. A threaded rod 42 is secured to sleeve 40 and extends outwardly therefrom. Auger shaft 44 slides over sleeve 40 and is rigidly secured thereto by nut 45 on the outer end of rod 42. Identical flighting 46 involving substantially one convolution around auger shaft 44 appears on each of the augers 34. The flighting has a peripheral edge 49. It is important that each of the auger shafts be synchronized and that the flighting be uniformly positioned on the supporting structure. The adjustment means shown in FIG. 11 permits the positions of the three augers 34 to be synchronized insofar as the relative position of the flighting 46 thereon is concerned.

The three augers are capable of linking an elongated strand of meat product passing therebetween by reason of the flighting 46 on each auger closing in close proximity at a pinch point or linking point 50 as shown typically in FIG. 8. The numeral 52 designates the central axis extending through the auger assembly in a direction parallel to and equidistant from the respective longitudinal axes of the three augers 34. When a strand of meat product 54 is moved along central axis 52, the flighting 46 closes on the strand at linking points 50 to compress the body of the strand and create a compressed decreased diameter in the strand at the linking point. As a result, individual links 56 are formed in strand 54.

An alternate form of the invention is shown in FIGS. 14–16, and this embodiment is particularly adaptable to very fragile strands of meat product which may not have an artificial casing on the outer surface thereof. A gear housing 57 (FIG. 15) includes a drive gear 60 and a planetary gear 62 which has a hollow sleeve which is in rigid contact with drive gear 60. Auger gears 30 which have been previously described are rotatably mounted on planetary gear plate 62 and are in rotatable operative contact with gear ring 66. A hollow sun gear 67 with outer bore 67A is meshed with each of the auger gears 34. The gear 67 of FIG. 15 causes the augers 34 to rotate individually and collectively in the same direction. Thus, when rotational motion is imparted to drive gear 60 from a power source (not shown), planetary gear member 62 is rotated which causes gears 30 to rotate about the central axis 52. By reason of the engagement of gears 30 with ring gear 68, the gears 30 also rotate about their own respective axes, thus causing the augers to individually rotate about their own axes, and which causes all three augers to rotate about central axis 52.

At the other end of the assembly shown in FIG. 15, a plate 68 journals the opposite ends of the augers 34. A string reel 70 is secured to a reel housing 71 which is secured to frame 12. String 72 is wound on reel 70 and extends through eyelets 74 and 76 to be wound around the pinch points in strand 54 (FIG. 15) and to extend along the length of each link 56 between the pinch points 50 at opposite ends of each link. It is preferred that the string be comprised of a cellulose material which is edible.

A second embodiment of the invention is shown in FIGS. 17–20. A casing control element 78 is attached to each of the augers and has a first control surface 18 and a second drive surface 82. The control surface 80 is placed close to the horn or nozzle through which the meat emulsion is being extruded, but a small space 84 is left therebetween to permit the casing material to move between the outlet end of the horn or nozzle and the control element. The drive surface 82 on control element 78 is the surface that imparts rotational motion to the casing on the outside surface of the strand 54. Beyond the drive surface 82, the casing is permitted to expand to the full diameter thereof whereupon it becomes linked by the augers as previously described.

An alternate form of the control element 78 is shown in FIGS. 19 and 20 by the control element 86 which has a first control surface 88 and a drive control surface 90 which perform essentially the same functions as the previously described surfaces 80 and 82, respectively. It is preferred that the diameter of the control elements as measured at the drive surfaces thereof be approximately one and one-half times greater than the diameter of the meat emulsion strand 54 passing between the drive surfaces. This ratio allows the strand to be twisted approximately one and one-half times as the strand encounters the pinch points 50 described heretofore.

FIG. 21 shows a modified form of the structure of FIG. 2. FIG. 21 shows a device capable of linking conventional encased meat emulsion having a shirred casing 18. In FIG. 21, the horn 16 and casing 18 terminate within sun gear and chuck 92 which meshes with the gears 30 and augers 34. "Gear-chuck" 92 has a center bore 94 into which chuck insert 96 is slidably inserted. Gear-chuck 92 is detachably held within bore 94 by means of resilient O-ring 98 which dwells in arcuate annular grooves in the insert and bore 94 (FIG. 23). Insert 96 has a center bore 100 which has a cylindrical aperature 102 inbetween tapered walls 104 and 106. As shown in FIG. 21, the diameter of horn 16 is slightly less than that of aperature 102 to permit casing 18 to be drawn therethrough. The chuck insert 96 imparts rotational motion to the casing 18. When the rotatably filled casing 108 engages augers 34 as described above in regard to the device of FIG. 2, casing 108 will be linked. For different diameter casings, or horns, alternate chuck insert 96A can be used (FIG. 22).

It is therefore seen that the auger assembly is a vast improvement over the linking chains of the prior art since they are economical of manufacture, more durable and trouble free, and are adapted to effect linking on strands of extruded meat products whether the strands are rotating or not, and whether or not they are encased in a separate casing material. The auger assembly is particularly adaptable to linking fragile strands of extruded meat product.

It is therefore seen that the apparatus and method of this invention achieve at least their stated objectives.

I claim:

1. A linking apparatus for a sausage encasing machine having a meat emulsion extruding element, comprising, three elongated parallel auger means rotatably mounted on said machine downstream from said meat emulsion extruding element, said auger means each including helical elongated flighting elements, said flighting elements having a peripheral edge having a sufficient radius with respect to each of their longitudinal axis so that said peripheral edges of said flighting elements of each auger will progressively come into close proximity with respect to each other at a linking point on said extended axis of said horn, whereby said linking point will progressively move longitudinally along a central axis parallel to the axes of said auger means when said auger means are all rotated in unison the same direction, and means on said machine for rotating said auger means in unison in one direction.

2. The linking apparatus of claim 1 wherein each of said auger means has a longitudinal axis which is equally spaced with respect to each other.

3. The linking apparatus of claim 1 wherein the flighting elements on each auger means are identical.

4. The linking apparatus of claim 1 wherein each of said auger means includes an elongated center shaft on the longitudinal axis thereof, a casing control element on each of said shafts adjacent said outlet end of said extruding element and being positioned upstream of said flighting elements, each of said control elements having a first control surface which is closely spaced with respect to the outside surface of said extruding element so as to permit a tubular casing to move longitudinally between said outside surface of said extruding element and said first control surface.

5. The apparatus of claim 4 wherein said control elements are rotatably mounted on said center shafts.

6. The apparatus of claim 4 wherein said control elements have a second control surface downstream from said first control surface, said control elements having an effective diameter at said first control surface that is greater than at said second control surface to permit the effective diameter of a casing moving from said horn to increase in diameter as it moves from said first control surface to said second control surface.

7. The apparatus of claim 1 wherein said auger means are mounted on a rotatable frame means to permit said three auger means to rotate as a unit around an axis equidistant from the axes of said three auger means while each of said auger means rotates about its own longitudinal axis, and means on said machine for rotating said frame means.

8. The apparatus of claim 7 wherein a reel of string is positioned adjacent said frame means, and a length of string extends therefrom, said length of string extending from said reel into the path of an elongated strand of meat emulsion extruded from said extruding element and moving along the axis of said frame means, to encircle said strand where said strand has encountered said linking point, and to extend along the length of said strand inbetween the positions that said string has encountered said linking point.

9. The apparatus of claim 8 wherein said string is comprised of an edible substance.

10. The apparatus of claim 1 wherein said linking point of said flighting elements is adapted to create links in an elongated strand of meat emulsion passing along said central axis.

11. The method of use of the apparatus of claim 1, comprising, passing an elongated strand of meat product along said central axis whereby the link point on said auger flighting will progressively create a plurality of links along the length of said strand.

12. The method of claim 11 wherein said elongated strand is not rotating as it moves along said central axis.

13. The method of claim 11 wherein said auger means are rotated about said central axis.

14. The method of claim 13 wherein a string is progressively wrapped around said elongated strand at said linking point and extends along the length of each link to the next succeeding linking point.

15. The method of use of the apparatus of claim 1, comprising, passing an elongated strand of meat product along said central axis whereby the link point on said auger flighting will progressively create a plurality of links along the length of said strand.

16. The apparatus of claim 7 wherein a reel of string is positioned on said frame means, and a length of string extends therefrom, said length of string extending from said reel into the path of an elongated strand of meat emulsion extruded from said extruding element and moving along the axis of said frame means, to encircle said strand where said strand has encountered said linking point, and to extend along the length of said strand inbetween the positions that said string has encountered said linking point.

17. The linking apparatus of claim 1 wherein a sun gear with a center bore therein is in mesh with gears on each of said auger means.

18. The linking apparatus of claim 7 wherein a sun gear with a center bore therein is in mesh with gears on each of said auger means.

19. The linking apparatus of claim 17 wherein a chuck insert is in the center bore of said sun gear to impart rotational motion to an elongated casing passing through said center bore, and said meat emulsion extruding element having an outlet end in close proximity with said chuck insert.

20. The linking apparatus of claim 19 wherein said chuck insert is detachably mounted in said center bore of said sun gear.

21. The apparatus of claim 20 wherein said chuck insert has a cylindrical aperture between opposite walls tapered outwardly therefrom.

22. The method of claim 11 wherein said auger means are rotated in the same direction about their respective axes and about said central axis.

23. The linking apparatus of claim 17 wherein a chuck insert is operationally connected to said sun gear to impart rotational motion to an elongated casing passing through said center bore, and said meat emulsion extruding element having an outlet end in close proximity with said chuck insert.

24. A linking apparatus for a sausage encasing machine having a meat emulsion extruding element, comprising,
a plurality of parallel auger means rotatably mounted on said machine downstream from said meat emulsion extruding element,
said auger means each including helical elongated flighting elements,
said flighting elements having a peripheral edge having a sufficient radius with respect to each of their longitudinal axis so that said peripheral edges of said flighting elements of each auger will progressively come into close proximity with respect to each other at a linking point on said extended axis of said horn, whereby said linking point with progressively move longitudinally along a central axis parallel to the axes of said auger means when said auger means are all rotated in unison the same direction,
and means on said machine for rotating said auger means in unison in one direction.

* * * * *

UNITED STATES PATENT AND TRADEMARK OFFICE
CERTIFICATE OF CORRECTION

PATENT NO. : 5,279,516
DATED : January 18, 1994
INVENTOR(S) : Ray T. Townsend

It is certified that error appears in the above-indentified patent and that said Letters Patent is hereby corrected as shown below:

Column 5, line 17, change "adjacent" to --on--.

Column 6, line 48, change "with" to --will--.

Signed and Sealed this

Twenty-first Day of June, 1994

Attest:

BRUCE LEHMAN

Attesting Officer      Commissioner of Patents and Trademarks

UNITED STATES PATENT AND TRADEMARK OFFICE
CERTIFICATE OF CORRECTION

PATENT NO.   : 5,279,516
DATED        : January 18, 1994
INVENTOR(S)  : Ray T. Townsend It is certified that error appears in the above-indentified patent and that said Letters Patent is hereby corrected as shown below:

Column 5, line 17, change "adjacent" to --on--.
Column 6, line 13, change "in the center bore of" to --operationally connected to--.
Column 6, line 48, change "with" to --will--.

Signed and Sealed this

Thirteenth Day of September, 1994

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5,279,516
DATED : January 18, 1994
INVENTOR(S) : Ray T. Townsend

It is certified that error appears in the above-indentified patent and that said Letters Patent is hereby corrected as shown below:

Column 3, line 20, "34" should be deleted and --30-- inserted in place thereof.

Column 3, line 26, "ring gear 68" should be deleted and --sun gear 67-- inserted in place thereof.

Column 3, line 43, "18" should be changed to --80-- to correct a reference numeral error.

In claim 1, at column 4, line 42, after "auger" insert --means--.

In claim 1, at column 4, line 44, delete "said extended axis of said horn" and insert in place thereof --an extended axis of said meat emulsion extruding element--.

Signed and Sealed this

Fifth Day of September, 1995

Attest:

BRUCE LEHMAN

*Attesting Officer*                *Commissioner of Patents and Trademarks*